US008190355B2

(12) United States Patent
Emam et al.

(10) Patent No.: US 8,190,355 B2

(45) Date of Patent: May 29, 2012

(54) DRIVING ASSISTANCE AND MONITORING

(75) Inventors: Ossama Emam, Mohandessen (EG); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 12/247,451

(22) Filed: Oct. 8, 2008

(65) Prior Publication Data

US 2009/0096634 A1 Apr. 16, 2009

(30) Foreign Application Priority Data

Oct. 10, 2007 (EP) .................................... 07118174

(51) Int. Cl.
*G06F 17/10* (2006.01)

(52) U.S. Cl. ........ 701/300; 359/742; 359/843; 359/844; 359/850; 359/865; 248/148; 248/467; 248/479; 180/169; 200/61

(58) Field of Classification Search .................. 701/300; 359/742, 843, 844, 850, 865, 864, 866, 868, 359/871, 872, 875, 877; 248/148, 467, 479; 240/435, 901, 903, 904; 180/169; 200/61.27, 200/61.54; 369/909
See application file for complete search history.

(56) References Cited

U.S. PATENT DOCUMENTS

| | | | | | |
|---|---|---|---|---|---|
| RE30,673 | E | * | 7/1981 | Feinbloom | 359/837 |
| 5,574,426 | A | * | 11/1996 | Shisgal et al. | 340/435 |
| 6,792,339 | B2 | | 9/2004 | Basson et al. | |
| 7,016,517 | B2 | | 3/2006 | Furusho | |
| 7,336,219 | B1 | * | 2/2008 | Lohmeier et al. | 342/159 |
| 2004/0085447 | A1 | * | 5/2004 | Katta et al. | 348/143 |
| 2007/0009137 | A1 | | 1/2007 | Miyoshi et al. | |
| 2008/0021635 | A1 | * | 1/2008 | Lohmiller et al. | 701/202 |
| 2010/0049393 | A1 | * | 2/2010 | Emam et al. | 701/29 |

* cited by examiner

*Primary Examiner* — James Trammell
*Assistant Examiner* — McDieunel Marc
(74) *Attorney, Agent, or Firm* — Hoffman Warnick LLC; Andrea Bauer

(57) ABSTRACT

A data processing method for alerting a first vehicle when entering and/or residing in a blind spot of at least one second vehicle and a system and a computer program implementing such a method. A method in accordance with an embodiment includes: determining and dynamically updating the position of second vehicle, the blind spot of the second vehicle, and the time for the first vehicle to enter the blind spot. An alarm signal is generated when the first vehicle is entering or residing in a blind spot of the second vehicle. The method also includes steps to generate direction for the first vehicle to avoid entering in or to leave the blind spot of the second vehicle.

24 Claims, 3 Drawing Sheets

DRIVING ASSISTANCE AND MONITORING

FIELD OF THE INVENTION

The present invention relates to the field of driving assistance and monitoring for vehicles. More precisely, the present invention pertains to a blind spot monitoring system and, more specifically, relates to systems, methods and computer programs that alert a driver of a vehicle when entering and residing in another vehicle's various blind spots.

BACKGROUND OF THE INVENTION

Drivers on today's roads are faced with the problem of a blind spot. This causes many drivers to get into accidents, e.g., because they switch lanes and are hit by a vehicle travelling in their blind spot.

In spite of having a plurality of mirrors there are usually areas, known as blind spots, which are not covered by the mirrors. Very often, the blind spots cover space to the left and right sides as well as directly behind the vehicle. The position of side and rear view mirrors can reduce the side blind spots. However, it is impossible to eliminate all blind spots with mirror adjustment. The exact area varies depending on the type of vehicle and height of driver.

The work that has been done to solve the blind spot problem is directed towards developing blind spot monitoring systems that will alert the driver of vehicles present in their own blind spots.

There is also known an image generation apparatus, as described in US patent application US 2007/0009137, comprising one or more camera units installed on a first body. The camera units are used for capturing the image around the first body. The image generation apparatus further comprises a blind spot calculation unit for calculating blind spot information of a second body. Examples of the second body include a vehicle, but also a pedestrian, building, etc. Further, the blind spot information consists in data representing a zone that is a blind spot for the driver. The blind spot information is displayed to driver of the first body.

Nevertheless, the known methodologies have a number of drawbacks. They require image transmission systems having a sufficient quality for the user to perceive a clear picture, which requires working with a high number of pixels. There must be space in the passenger compartment to be able to accommodate the corresponding screen. They are, therefore, expensive systems, which are not easy to use in situations of risk. Moreover, they don't process the image but only transmit it. The vehicle's driver has to visually view every surrounding vehicle, which may be time consuming and dangerous, especially when there are several second vehicles.

SUMMARY OF THE INVENTION

The present invention provides a method, system, and computer program for safely, quickly, and efficiently informing a driver of a first vehicle when entering in a blind spot of another vehicle.

The present invention further provides a method, system, and computer program for informing a driver of a first vehicle of possibilities for reacting when entering in a blind spot of another vehicle.

The present invention comprises a method for alerting a first vehicle when entering or residing in a blind spot of at least one second vehicle. This method is dynamically carried out on a real time or periodic basis, and comprises:

detecting at least one second vehicle in a surrounding area of the first vehicle; determining at least one blind spot position of the at least one second vehicle, based on data relating to the at least one second vehicle; and alerting a driver of the first vehicle with an alarm signal that the first vehicle is entering or residing in the at least one blind spot.

Thanks to the invention, the driver of the first vehicle is alerted when entering or residing in at least one blind spot of at least one second vehicle. Thus, the driver of the first vehicle does not have to visually track and analyze an image, and can focus on the road and driving actions. The method according to the invention enables a driver to be informed when entering or residing in a blind spot of at least another vehicle more safely, quickly, and efficiently than the prior art methods and systems.

In addition, the present invention does not necessarily need image transmission. Therefore the system implementing the method according to the invention is less expensive than currently known blind spot monitoring systems.

By vehicle, it is meant all types of transportation means, for instance a rolling, flying, and/or floating body. Examples of vehicle include bicycle, vehicle, bus, truck, plane, ship, a submarine, or the like.

The alarm signal may be a light or sound or tactile signal or a combination thereof. In addition, different alarm signals may be triggered according to different situations, such as whether the first vehicle is residing in the blind spot or is entering or leaving this blind spot.

The blind spot determination may comprise computing data representing the position and possibly the type of the second vehicle. The blind spot area, i.e., its dimensions and position, is computed according to the position of the second vehicle. Moreover, the computed blind spot effective area is computed or modified according to the average dimension of a blind spot for the specific type of the second vehicle. For example, rear blind spots for a first type of car may range from 12-17 feet behind the vehicle, may range from 13-23 feet for a second type of car, and may range from 29-51 feet for a third type of car. Each of these ranges accounts for various heights of the driver.

The determining may furthermore comprise computing data representing the second vehicle driver's height and the length of the second vehicle or of its trailer, the blind spot position being further determined according to these measurements.

Moreover, the invention dynamically and repeatedly updates the blind spot positions according to second vehicle speed and orientation. Before or interleaved with the updating, the method according to the invention may comprise at least one iteration of computing data relating to the speed and orientation.

The method according to the invention may thus comprise computing data relating to the shape of the travel road as seen from the first vehicle and/or the behavior of the surrounding vehicles, for determining the orientation and/or trajectory of the second vehicle. The speed of the second vehicle may be determined by known methods and systems.

In an embodiment, the method may comprise modeling the second vehicle driver's behavior, the blind spot positions being further updated according to the driver behavior. The modeling of the behavior of the second vehicle's driver may comprise the computation of data related to:

the average value of characteristics of a typical driver and the range of the values;

the data relating to the second vehicle's environment; and/or the data relating to the position and/or the orientation of the head of the second vehicle driver.

Moreover, according to the invention, at least one parameter may be determined by the second vehicle itself and/or at least one surrounding third vehicle and communicated to the first vehicle, the parameter being chosen among the following parameters:

the absolute or relative position of at least one blind spot of the second vehicle;

the position of the second vehicle;

the speed of the second vehicle;

the orientation of the second vehicle;

the second vehicle trajectory or its modeled travel road shape;

the height of the second vehicle's driver; or the behavior of the second vehicle's driver.

The invention further includes calculating the time for the first vehicle to enter the blind spot according to the position of this blind spot, the position of the first vehicle, the speed of the second vehicle, and the speed of the first vehicle.

In another embodiment, an indication is provided to the first driver regarding at least one direction for avoiding entering a blind spot of the second vehicle, or for leaving a blind spot of the second vehicle in which the first vehicle is residing. The method according to the invention provides guidance for the first vehicle to how to move away from blind spot or to how to avoid entering the blind spot. To this extent, the method predicts a direction for the first vehicle to change its course and make sure that it does not distract the driver of the first vehicle and does not cause the first vehicle to enter in other dangerous situations by suggesting to change the course. For example, the indication can be "slow-down". Before indicating the first vehicle to slow down, it is made sure that there is no car behind the first vehicle that would or could hit the first vehicle. This is especially important since blind spots often occur when the first vehicle overtakes with high speed the second vehicle and slowing down is very dangerous. Other indications may comprise "speed up", "turn left", "turn right" or a combination of at least two of these indications.

The invention also provides a system comprising computer means adapted for implementing the method according to the invention and a vehicle comprising such a system.

The invention further provides a computer program comprising instructions for implementing the steps of the method according to the invention.

BRIEF DESCRIPTION OF THE DRAWINGS

The various embodiments of the present invention, modes of use, and aspects and advantages thereof, will best be understood by reference to the following detailed description read in conjunction with the accompanying drawings.

DETAILED DESCRIPTION OF THE INVENTION

In the following specifications, elements common to several figures are referenced through a common identifier.

Figure 1:
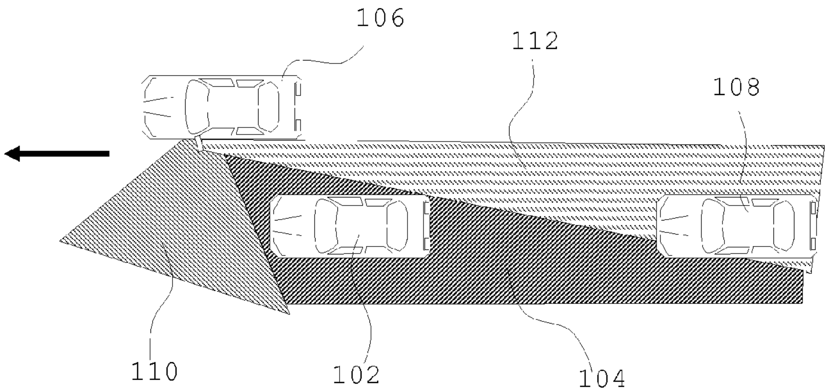
FIG. 1 schematically illustrates a dangerous situation where a first vehicle is in the blind spot of a second vehicle.

FIG. 1 is a schematic representation of an example of a risk situation that car drivers are facing on the road.

As shown in FIG. 1, a first car 102 is residing in the blind spot 104 of a second car 106. A third car 108 is about to enter the blind spot of the second car 106. Indeed, only lateral area 110 is directly visible when the driver of the second car 106 turns his head to the left, thus losing his visual track. Rear area 112 can be seen by the driver of the second car 106 through the rear-view mirror. The third car 108 can be seen by the driver of the second car 106 through the rear-view mirror. The left rear area 104 is the blind spot of this second vehicle 106. The first car 102 is positioned in the blind spot 104 and therefore cannot be seen by the driver of the second car 106.

According to the invention, the blind spot 104 of a second car 106 may be identified using different methods according to the available data.

In an embodiment, a combination of these different methods is used in real-time, according to the data currently available.

A main basic method is carried out by assuming that the driver in the second car 106 has a standard position and environment, e.g., looks straight ahead and has some typical location height for his/her head and some typical orientation for a mirror in the car. On this basis, the blind spot 104 is pre-calculated in advance and is the same for each type of a car. Thus, the first car 102 or the third car 108 detects the presence of the second car 106 and determines its blind spot 104. As a result, the driver of the first car 102 is alerted when traveling into the blind spot area 104 of the second vehicle 106.

A complementary method, which may be optional in the system, uses a monitoring system in the first car 102 or the third car 108 for observing the driver and his environment in the second car 106 and uses this information for dynamically computing or updating the blind spot 104.

Yet another complementary method can be carried out when the second car 106 is itself equipped with a monitoring system compatible with the monitoring system of the first car 102 and is in communication with the monitoring system of the first car 102.

The monitoring system in the second car 106 is able to detect a driver head position and calculate dynamically the blind spot of the second car 106. An example of such a monitoring system is described in U.S. Pat. No. 6,792,339, entitled "Artificial passenger with condition sensors".

The monitoring system in the second car 106 communicates the data to other nearby cars, including the first car 102 and the third car 108. This enables the intelligent system in the first car 102 and second car 106 to calculate more accurately the blind spot 104 of the second car 106.

Figure 2:
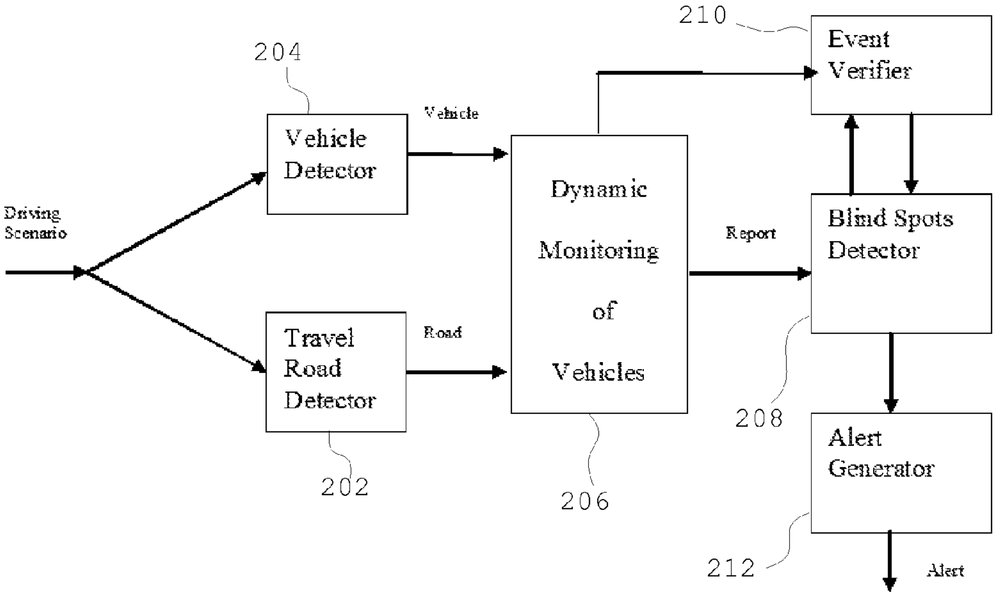
FIG. 2 schematically illustrates a logic view of a system according to the invention.

FIG. 2 is a logic view of different component parts of a system according to the present invention. For a given first vehicle 102 or a third vehicle 108, a travel road detector 202, such as the one described in U.S. Pat. No. 7,016,517, entitled "Travel road detector" can be used for detecting the shape of the travel path or trajectory. Also, a vehicle detector 204 is provided that is capable of detecting another vehicle existing at least in the vicinity of the host vehicle. An example of a vehicle detector is described in patent application US 2006/0089799, entitled "Vehicle detector and vehicle detecting method".

The output of the travel road detector 202, i.e., the shape of the modeled travel road, and the output of the vehicle detector 204, i.e., the nearby vehicles, are fed to a dynamic monitoring of vehicles module 206. The dynamic monitoring of vehicles module 206 uses the input information about the road model and the surrounding vehicles for generating a report that is sent to a blind spot detector 208. The blind spot detector 208 calculates the time needed to enter blind spots, and predicted duration of staying in those blind spots. It also uses an event verifier 210 that receives continuous updates from the dynamic monitoring of vehicles module 206 to check the validity of the calculated assumptions. The blind spot detector 208 communicates the final decision to an alert generator 212, which generates the correct alert based on pre-defined alert definitions. For instance, the driver can choose to have sound and/or light and/or a vibrating flashing alert. Such an alert may also be set for displaying the alert in a position that is indicative of the orientation of the blind spot that he/she enters, e.g., relative to his vehicle. This sound/light/tactile alert may change tone or speed of flashing based on the approaching of the blind spot and also the residing in or leaving that blind spot. In the example of FIG. 1, the alert generator 212 in the first car 102 indicates a direction for leaving the blind spot 104, and the alert generator in the third car 108 indicates a direction for avoiding entering the blind spot 104.

Figure 3:
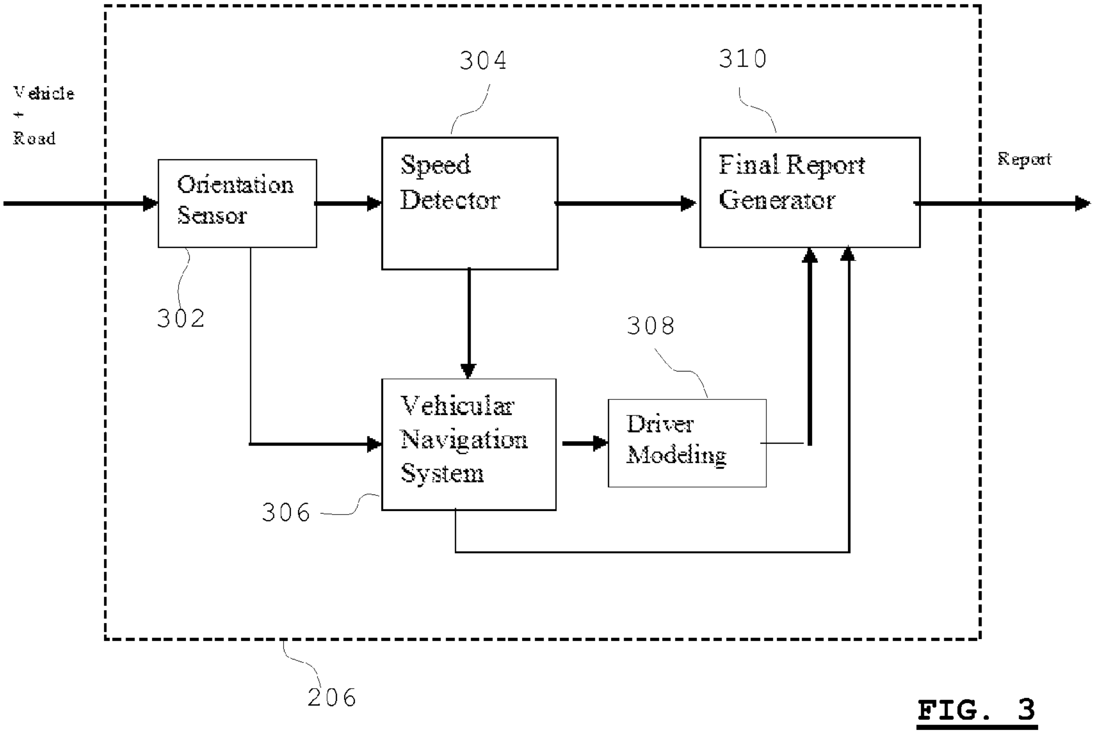
FIG. 3 schematically illustrates a logic view of a vehicle's dynamic monitoring module according to the invention.

FIG. 3 is a logic view of different component parts of the dynamic monitoring of vehicles module 206. The input to the dynamic monitoring of vehicles module 206 is the location of surrounding vehicles which is output by the vehicle detector 204, and the travel road shape or model, which is output by the travel road detector 202. This information is used by an orientation sensor 302 to decide the orientation, left or right or more accurate path or trajectory, of any preceding second vehicle that is candidate for generating residing blind spots.

The output of the orientation sensor 302 is input to a speed detector 304 which detects the speed of each of those candidate vehicles. The output of the orientation sensor 302 and the output of the speed detector 304 are input to a vehicular navigation system 306 which is used to detect the exact position and coordinates, and possibly type, of those candidate vehicles.

A driver modeling module 308, receiving the output of the vehicular navigation system 306, uses average characteristics and range of these characteristics for a typical driver in each of the candidate vehicles, e.g., a height of a driver, direction where a driver looks, etc., to pre-calculate residing blind spots for each of the candidate vehicles.

A final report generator 310 is used to consolidate the input from the speed detector 304, the vehicular navigation system 306, and the driver modeling module 308 for generating a final report output, towards the blind spot detector 208.

Figure 4:
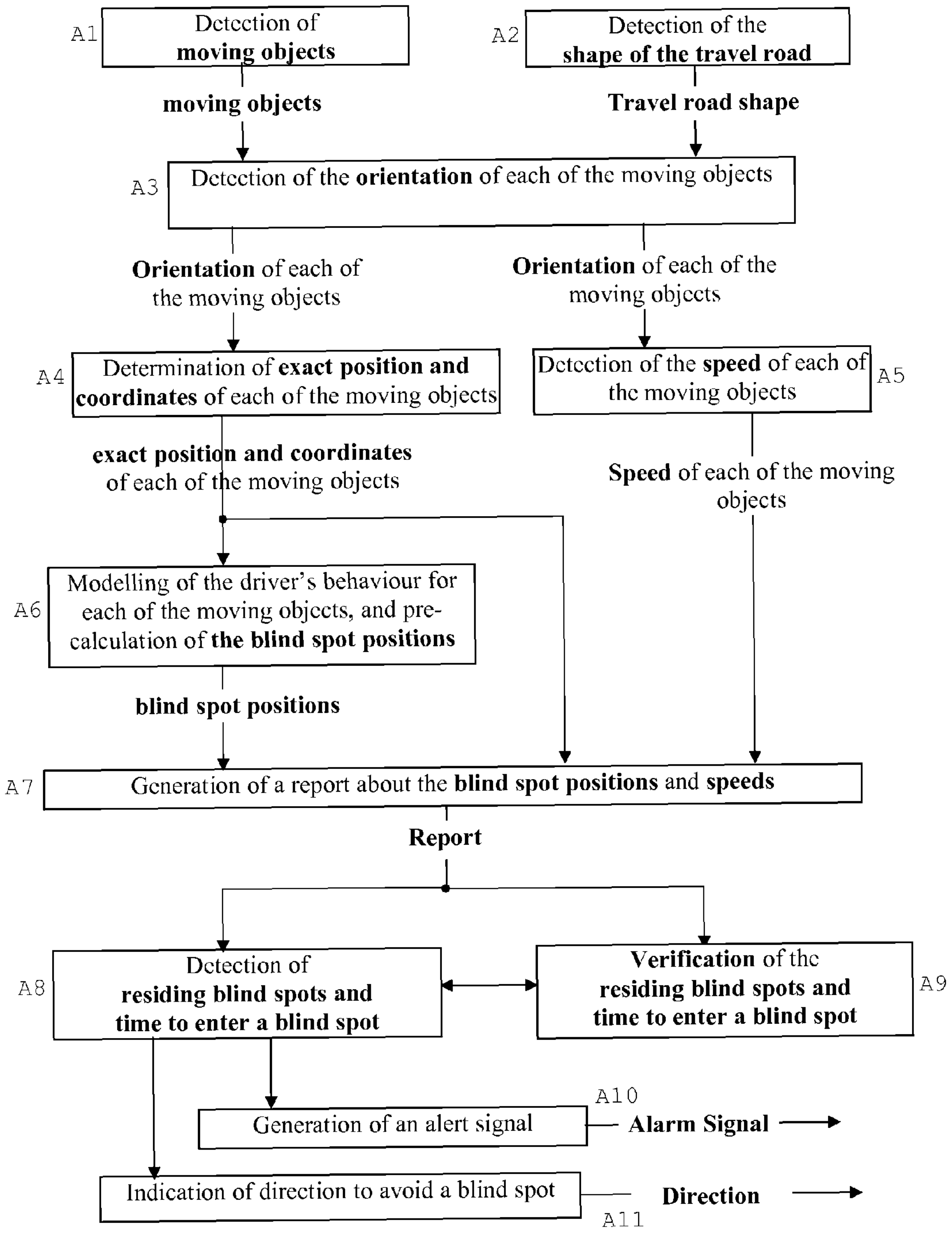
FIG. 4 schematically illustrates the progress of a process to calculate time to enter a blind spot according to the invention.

FIG. 4 is a block diagram of a method according to the invention.

At A1, moving vehicles in the vicinity of a host vehicle are detected. At A2, the shape of the travel path or trajectory is detected. The output of A1 and A2 are used at A3 to detect the orientation of each moving object.

At A4, the exact position and coordinates of each of the moving objects are detected. At A5, the speed of each of the moving objects is detected. At A6, the driver's behavior for each of the moving objects and pre-calculations of blind spot positions are modeled. At A7, using the output of A5 and A6, a report about the blind spot positions and speeds is generated.

At A8, residing blind spots and the time to enter a blind spot are detected. At A9, the residing blind spots and the time to enter a blind spot are verified. At A10, an alert signal is generated. At A11, an indication of direction to avoid a blind spot is provided.

While the invention has been particularly shown and described mainly with reference to a preferred embodiment, it will be understood that various changes in form and detail may be made therein without departing from the spirit, and scope of the invention.

The invention claimed is:

1. A method for alerting a first vehicle when entering or residing in a blind spot of a second vehicle, the method comprising:

detecting by a processor a second vehicle in a surrounding area of the first vehicle;

determining the processor a blind spot position of the second vehicle based on data relating to the second vehicle, wherein the determining further comprises computing data representing a length of the second vehicle and a height of a driver of the second vehicle, the blind spot position being further determined according to the length and the height; and alerting a driver of the first vehicle with an alarm when the first vehicle is entering or residing in the blind spot.

2. The method according to claim 1, wherein the determining further comprises:

computing data representing a position of the second vehicle, the blind spot position being determined according to a position of the second vehicle.

3. The method according to claim 1, further comprising:

dynamically updating the blind spot position according to a speed and orientation of the second vehicle, the updating further comprising computing data relating to the speed and orientation.

4. The method according to claim 3, further comprising:

modeling a behavior of the driver of the second vehicle, the blind spot position being further updated according to the behavior.

5. The method according to claim 4, wherein the modeling further comprises:

computing data related to the behavior of the driver of the second vehicle according to at least one of:

average value of characteristics of a typical driver and a range of the values; data relating to an environment of the second vehicle; and data relating to at least one of a position and an orientation of a head of the second vehicle driver.

6. The method according to claim 3, further comprising:

computing data relating to at least one of a shape of a travel road of the second vehicle and a behavior of surrounding vehicles, the orientation of the second vehicle being determined according to at least one of the shape and behavior.

7. The method according to claim 1, wherein at least one parameter is determined by the second vehicle and a surrounding third vehicle and communicated to the first vehicle, each parameter being selected from the group consisting of:

a position of the blind spot;

a position of the second vehicle;

a speed of the second vehicle;

an orientation of the second vehicle;

a trajectory or travel road shape of the second vehicle;

a height of a driver of the second vehicle; and a behavior of the driver of the second vehicle.

8. The method according to claim 1, further comprising:

calculating a time for the first vehicle to enter the blind spot.

9. The method according to claim 1, wherein the alarm comprises at least one of a light and a sound signal.

10. The method according claim 1, wherein a different alarm is provided when the first vehicle is residing in the blind spot, or the first vehicle is entering the blind spot.

11. The method according to claim 1, further comprising:

indicating at least one direction to the driver of the first vehicle to avoid entering the blind spot or to leave the blind spot.

12. A system for alerting a first vehicle when entering or residing in a blind spot of a second vehicle, comprising:

a system for detecting a second vehicle in a surrounding area of the first vehicle;

a system for determining a blind spot position of the second vehicle based on data relating to the second vehicle, wherein the system for determining further comprises a system for computing data representing a length of the second vehicle and a height of a driver of the second vehicle, the blind spot position being further determined according to the length and the height; and a system for alerting a driver of the first vehicle with an alarm when the first vehicle is entering or residing in the blind spot.

13. The system according to claim 12, wherein the system for determining further comprises:

a system for computing data representing a position of the second vehicle, the blind spot position being determined according to a position of the second vehicle.

14. The system according to claim 12, further comprising:

a system for dynamically updating the blind spot position according to a speed and orientation of the second vehicle, the updating further comprising computing data relating to the speed and orientation.

15. The system according to claim 14, further comprising:

a system for modeling a behavior of the driver of the second vehicle, the blind spot position being further updated according to the behavior.

16. The system according to claim 15, wherein the system for modeling further comprises:

a system for computing data related to the behavior of the driver of the second vehicle according to at least one of:

average value of characteristics of a typical driver and a range of the values; data relating to an environment of the second vehicle; and data relating to at least one of a position and an orientation of a head of the second vehicle driver.

17. The system according to claim 14, further comprising:

a system for computing data relating to at least one of a shape of a travel road of the second vehicle and a behavior of surrounding vehicles, the orientation of the second vehicle being determined according to at least one of the shape and behavior.

18. The system according to claim 12, wherein at least one parameter is determined by the second vehicle and a surrounding third vehicle and communicated to the first vehicle, each parameter being selected from the group consisting of:

a position of the blind spot;

a position of the second vehicle;

a speed of the second vehicle;

an orientation of the second vehicle;

a trajectory or travel road shape of the second vehicle;

a height of a driver of the second vehicle; and a behavior of the driver of the second vehicle.

19. The system according to claim 12, further comprising:

a system for calculating a time for the first vehicle to enter the blind spot.

20. The system according to claim 12, wherein the alarm comprises at least one of a light and a sound signal.

21. The system according claim 12, wherein a different alarm is provided when the first vehicle is residing in the blind spot, or the first vehicle is entering the blind spot.

22. The system according to claim 12, further comprising:

a system for indicating at least one direction to the driver of the first vehicle to avoid entering the blind spot or to leave the blind spot.

23. A system comprising:

a vehicle; and a system for alerting a first vehicle when entering or residing in a blind spot of at a second vehicle, the system for alerting comprising:

a system for detecting the second vehicle in a surrounding area of the first vehicle;

a system for determining a blind spot position of the second vehicle based on data relating to the second vehicle, wherein the system for determining further comprises a system for computing data representing a length of the second vehicle and a height of a driver of the second vehicle, the blind spot position being further determined according to the length and the height; and a system for alerting a driver of the first vehicle with an alarm when the first vehicle is entering or residing in the at least one blind spot.

24. A computer program loaded on a non-transitory computer readable medium, comprising instructions for alerting a first vehicle when entering or residing in a blind spot of a second vehicle, when said computer program is executed on a computer system, the instructions comprising:

detecting a second vehicle in a surrounding area of the first vehicle;

determining a blind spot position of the second vehicle based on data relating to the second vehicle, wherein the determining further comprises computing data representing a length of the second vehicle and a height of a driver of the second vehicle, the blind spot position being further determined according to the length and the height; and alerting a driver of the first vehicle with an alarm when the first vehicle is entering or residing in the at least one blind spot.

* * * * *